United States Patent [19]

Bryniarski et al.

[11] Patent Number: 4,854,983
[45] Date of Patent: Aug. 8, 1989

[54] ROTARY HEAT SEALING METHOD AND APPARATUS

[75] Inventors: David A. Bryniarski, Rochester; Robert E. Hollenbeck, Newark, both of N.Y.

[73] Assignee: Mobil Oil Corporation, New York, N.Y.

[21] Appl. No.: 99,807

[22] Filed: Sep. 22, 1987

[51] Int. Cl.$^4$ .............................................. B32B 3/00
[52] U.S. Cl. .................................. 56/70; 100/93 RP; 156/290; 156/308.4; 156/312; 156/359; 156/361; 156/383; 156/553; 156/582; 156/583.4; 493/193; 493/205; 493/208; 493/928
[58] Field of Search .................. 156/70, 553, 312, 582, 156/308.4, 583.4, 290, 361, 359, 383; 493/193, 208, 205, 928; 100/93 RP

[56] References Cited

U.S. PATENT DOCUMENTS

| | | |
|---|---|---|
| 2,125,758 | 8/1938 | Waters . |
| 3,221,613 | 12/1965 | Sanders . |
| 3,466,979 | 9/1969 | Sander et al. ................... 156/583.4 |
| 3,484,325 | 12/1969 | Pendleton ........................ 156/583.4 |
| 3,499,817 | 3/1970 | Havens et al. ................... 156/308.4 |
| 3,644,163 | 2/1972 | Schwartzkolf et al. ............ 156/361 |
| 4,030,956 | 6/1977 | Leloux ................................. 156/290 |
| 4,597,750 | 7/1986 | Boyd . |
| 4,624,654 | 11/1986 | Boyd . |

FOREIGN PATENT DOCUMENTS 51-71378   6/1976   Japan ................................. 156/290

Primary Examiner—John J. Gallagher
Attorney, Agent, or Firm—Alexander J. McKillop; Charles J. Speciale

[57] ABSTRACT

An apparatus and process to permit high speed continuous motion heat sealing in the transverse direction of a moving, multiple layer web of polyethylene film. The apparatus includes a circular drum with a heated seal bar mounted flush with its cylindrical surface. The web of film wraps around the cylindrical surface of the drum and moves at the same speed. The web is pressed against the cylindrical surface by a least one rubber nip roll and is heated sealed in the area of the seal bar. The invention is particularly adapted for presealing the ends of the drawtape in the manufacture of drawtape bags.

14 Claims, 5 Drawing Sheets

ROTARY HEAT SEALING METHOD AND APPARATUS

BACKGROUND OF THE INVENTION

This invention relates to a rotary heat sealing method and apparatus for the high speed continuous motion heat sealing in the transverse direction of a moving, multiple layer web of thermoplastic film.

The method and apparatus of the present invention is particularly suited for the manufacture of drawtape bags where the bags and the drawtapes are made of thermoplastic material such as for example polyethylene film. Examples of such draw tape bags are disclosed in U.S. Pat. Nos. 4,597,750 and 4,624,654. In the manufacture of draw tape bags, the ends of the drawtapes are presealed to the multiple layer web of film at the areas where the side seals of the bags are to be made to insure that the drawtapes will not pull loose from the side seals. It has been the practice heretofore to make the preseal by stopping the web and pressing heated seal bars against the preseal area. Other examples of heat sealing apparatus for plastic webbing are disclosed in U.S. Pat. Nos. 3,221,613 and 3,466,979. In U.S. Pat. No. 2,125,758 only instantaneous contact is made between the web and the heated roll.

It is an object of the present invention to provide a method and apparatus of accomplishing a preseal in a continuous manner without stopping the web and without the reciprocating motion of the seal bars, thus permitting a much higher speed of operation.

SUMMARY OF THE INVENTION

In accordance with one aspect of the present invention there is provided a method of heat sealing in the transverse direction of a continuously moving multiple layers web of thermoplastic film. The method comprises the steps of providing a cylindrical drum mounted for rotation about the axis thereof, providing a heated area in the cylindrical surface of the drum, wrapping the moving web of film around the cylindrical surface of the drum, rotating the cylindrical surface of the drum at the same speed as the moving web of film so that there is no relative motion between the web and the cylindrical surface, and pressing an area of the multiple layer web of thermoplastic film against the heated area in the cylindrical surface of the drum at at least one location about the cylindrical drum to form a heat seal in the multiple layer web.

In accordance with a further aspect of the invention the area of the multiple layer web of thermoplastic film is pressed against the heated area in the cylindrical surface of the drum by at least one rubber covered roll disposed about the cylindrical drum. In accordance with the further aspect of the invention the durometer of the rubber covered roll is selected so as to provide a dwell during the sealing contact between the web and the heated area in the cylindrical surface of the drum.

It is a further object of the invention to provide a rotary sealing apparatus for high speed continuous motion heat sealing in the transverse direction of a moving multiple layer web of thermoplastic film. The apparatus comprises a drum having a cylindrical surface, the drum being mounted for rotation about the axis thereof and means for continuously rotating the drum so that the speed of the cylindrical surface is the same as the speed of the web of film. A heated seal bar is mounted on the drum flush with the cylindrical surface and means for holding the web against the cylindrical surface of the drum is provided comprising a plurality of elastomer nip rolls disposed at spaced locations around a portion of the cylindrical surface of the drum and having the axes of the rolls parallel to the axis of the drum. The web of film is adapted to pass around the heated seal bar on the cylindrical surface of the drum and under the elastomer nip rolls and pressure means is associated with the nip rolls for successively forcing the same area of the film web against the heated seal bar at the spaced locations of the nip rolls thereby causing a seal to form between the multiple layers of the web of film.

In accordance with the further aspect of the invention each of the elastomer nip rolls is deformable and adapted to hold the area of the web to be sealed in contact with the heated seal bar for a distance greater than point contact between the heated seal bar and each of the elastomer nip rolls. The elastomer nip rolls preferably are silicone rubber having 30–40 durometer.

In accordance with a further aspect of the invention the heated seal bar has a non-stick coating to prevent the heated seal bar from adhering to the web of film. In a preferred form of the invention the non-stick coating is a fluorocarbon comprising a tape of polytetrafluoroethylene.

The foregoing and other objects, features and advantages of the invention will be better understood from the following, more detailed description and appended claims.

DESCRIPTION OF THE PREFERRED EMBODIMENT

Figure 1:
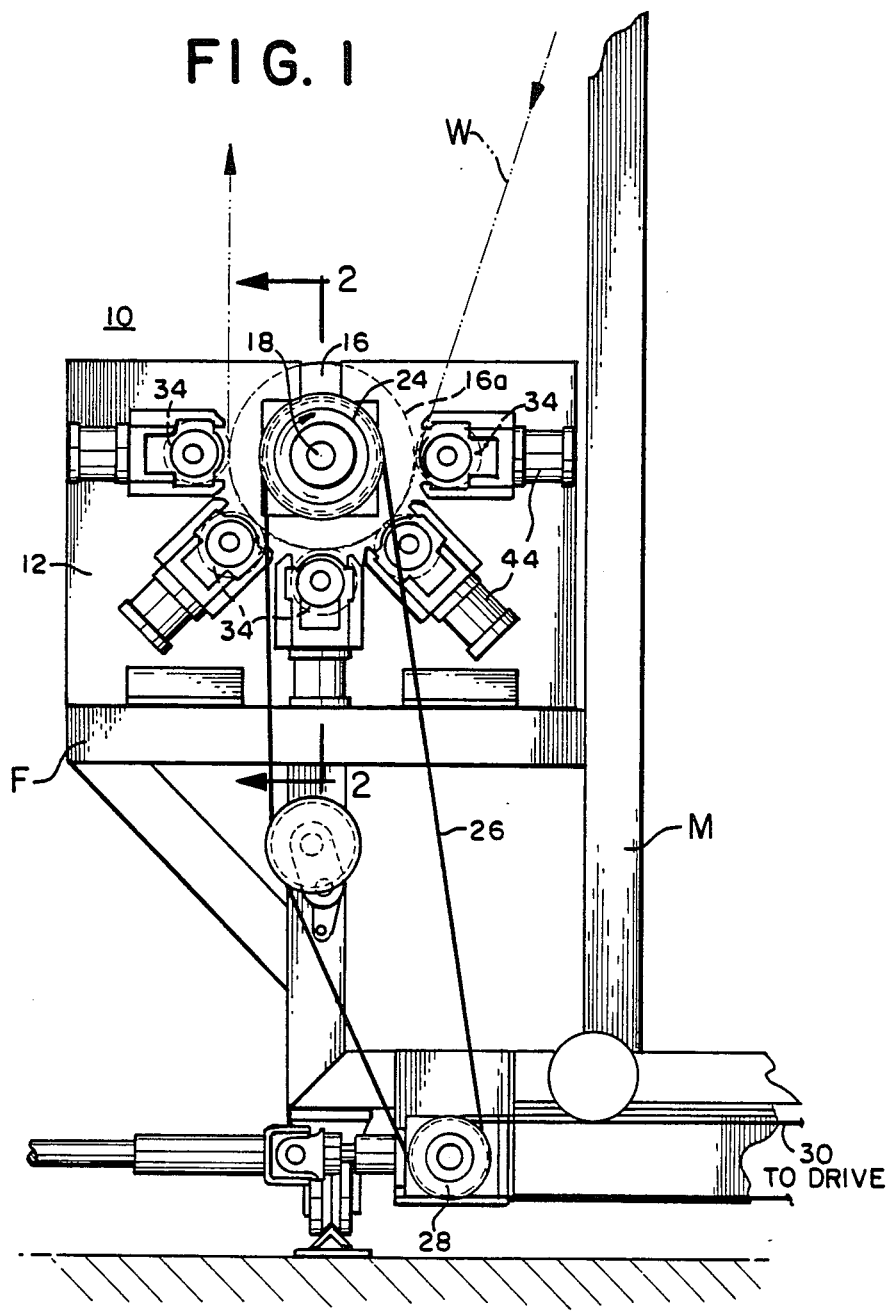
FIG. 1 is an elevation view of a rotary sealing apparatus for high speed continuous motion heat sealing of a moving multiple layers web of thermoplastic film embodying the present invention.

Referring to the drawing there is illustrated a rotary sealing apparatus for high speed continuous motion heat sealing of a moving multiple web of thermoplastic film. As shown in FIG. 1, the rotary sealing apparatus 10, embodying the present invention, has been illustrated in connection with a continuous hem tape machine M of the type used in the manufacture of drawtape bags. Machines of this type are well known in the art. For example a series of drawtape bags are formed from an extruded tube of polyethylene film. The tube is slit along one side to form open tops in the bag for receipt of trash and the like. The tube of film is folded along the other side to form the bag bottom. The superposed pliable panels of film are drawn continuously through the machine and have hems formed in the adjacent edges thereof at the open top. Drawtapes of are sealed parallel to the edges after the tapes have been inserted. As illustrated in FIG. 1 the web W identifies the multiple layer web of thermoplastic film after the hems have been formed in the slit edges of the film and the thermoplastic tapes inserted herein. The web W is then adapted to pass through the rotary sealing apparatus 10 where the ends of the tapes for the individual drawtape bags are adapted to be presealed to the bag prior to making the final transverse seal along the entire length of the bag.

Figure 2:
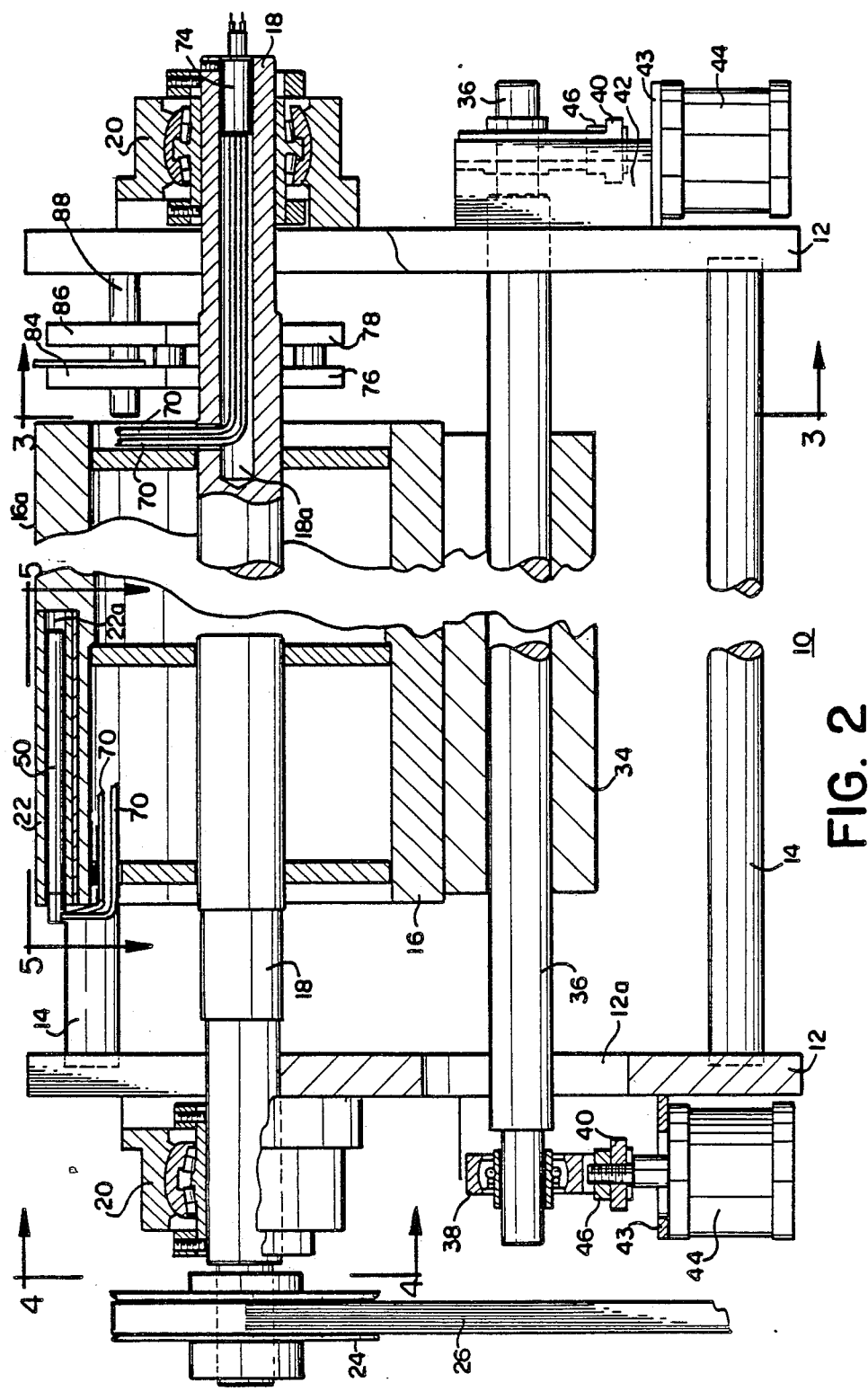
FIG. 2 is a vertical sectional view taken along the lines 2—2 in FIG. 1.

As shown in FIG. 1, the rotary sealing apparatus 10 is mounted on a frame F which is mounted against adjacent machine M. The web W is adapted to move in the direction of the arrows shown in FIG. 1 and pass from the continuous hem tape machine M through the rotary sealing apparatus 10. The rotary sealing apparatus 10 comprises a pair of side plates 12, FIG. 2, which are adjoined together in spaced relation by a plurality of spacer bars 14. A seal drum 16 mounted on stub shafts 18 is supported between the side plates 12 for rotation in bearings 20. As shown in FIG. 2, the bearings 20 are mounted on the exterior of the side plates 12 The seal drum 16 has a cylindrical surface 16a which has a continuously heated seal bar 22 mounted flush with the drum surface as hereinafter described.

One end of the drum shaft 18 is provided with a pulley 24 over which passes a belt 26. The belt 26 is driven from a pulley 28 which in turn is driven by a belt 30 from a common drive (not shown) for the continuous hem tape machine M. With this drive arrangement the cylindrical surface 16a of the drum 16 and the web W which passes around it travel at the same speed so that there is no relative motion between the two as the web W passes through the rotary sealing apparatus us 10.

Distributed around the lower half of the drum 16 are a plurality of soft elastomer nip rolls 34 such as silicone rubber. Each roll 34 is mounted on a shaft 36 which extends through openings 12a in the spaced side plates 12. The ends of the shafts 36 are journaled in bearings 38 carried by adjustable guide member 40 which in turn are supported by a pair of gibs or slide members 42. The slide members 42 are mounted in fixed position on the side plates 12. The members 42 are mounted in fixed position on the side plates 12. The members 42 also have fixed thereto cap members 43 on which are mounted pistons 46. The ends of the pistons 46 are threaded and adapted to extend through the openings in the outer ends of the members 40. Threaded split collar members 48 are positioned on the threaded ends of the pistons 46 and are adapted to adjust the bearing support members 40 relative to the cylindrical surface of the drum 16. This in turn adjusts the position of the rubber rollers 34 relative to the cylindrical surface 16 a of the seal drum 16.

Figure 5:
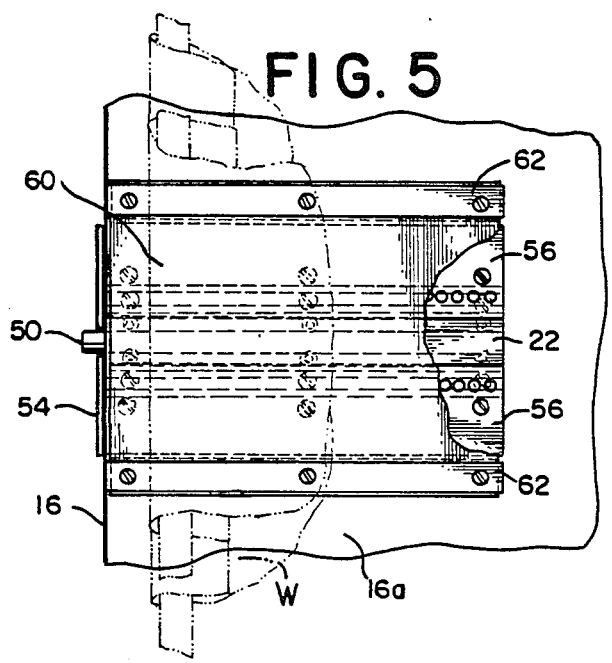
FIG. 5 is a fractional plan view taken along the lines 5—5 in FIG. 2.

The seal drum 16 has a length at least as great as the width of the web W that is passing through the rotary sealing apparatus 10. As may be seen in FIGS. 2 and 5 the heated seal bar 22 has a length extending axially of the drum only a fraction of the length of the drum 16. The reason for this is that the heated seal bar 22 need only have a length as great as the width of the hem formed in the thermoplastic web W.

As may be seen in FIGS. 2 and 4–6, the left-hand end of the drum 16 is provided with a cavity 16b for receiving the heated seal bar 22. The heated seal bar 22 is in the form of a metal heated block having a longitudinal opening 22a extending therethrough adapted to receive a heater rod 50. The heater rod 50 is held in place by means of a metal clamp 52 positioned beneath the rod 50 and secured to the block 22, the clamp 52 having a length corresponding to the length of the heater block 22. A retainer plate 54 is secured to the end of the seal drum 16 at the outer end of the heater block 22 and clamp 52.

A pair of clamps 56 of heat insulating material are positioned at the surface of the drum 16 and secured thereto on opposite sides of the heated seal bar 22. The clamps 56 preferably are provided with a series of holes or cut-outs extending along the length thereof adjacent the heated seal bar 22 to minimize heat transfer from the heated bar to the drum 16. The heated seal bar 22 is further insulted from the drum 16 by means of a heat insulation member 58 that lines the cavity 16b in the drum 16 and an air gap that separates the heater block 22 and support member 52 from the heat insulating member 58. The outer surface of the heated seal bar 22 is flush with the outer cylindrical surface 16a of the drum 16. This surface of the heated seal bar 22 is provided with a non-stick coating of fluorocarbon resin or equivalent material. In the embodiment illustrated in the drawings, the non-stick coating is illustrated as a tape 60 of non-stick material such as polytetrafluoroethylene sold under the duPont trademark Teflon which extends over the heated seal bar 20 and the insulating members 58 and is held in place by a pair of tape clamps 62. The tape 60 has a width corresponding to the length of the heated seal bar 22 and thus prevents direct engagement between the heated bar 22 and the thermoplastic web W. The Teflon tape 60 is for the purpose of preventing the web W from sticking to the heated seal bar 22.

Figure 3:
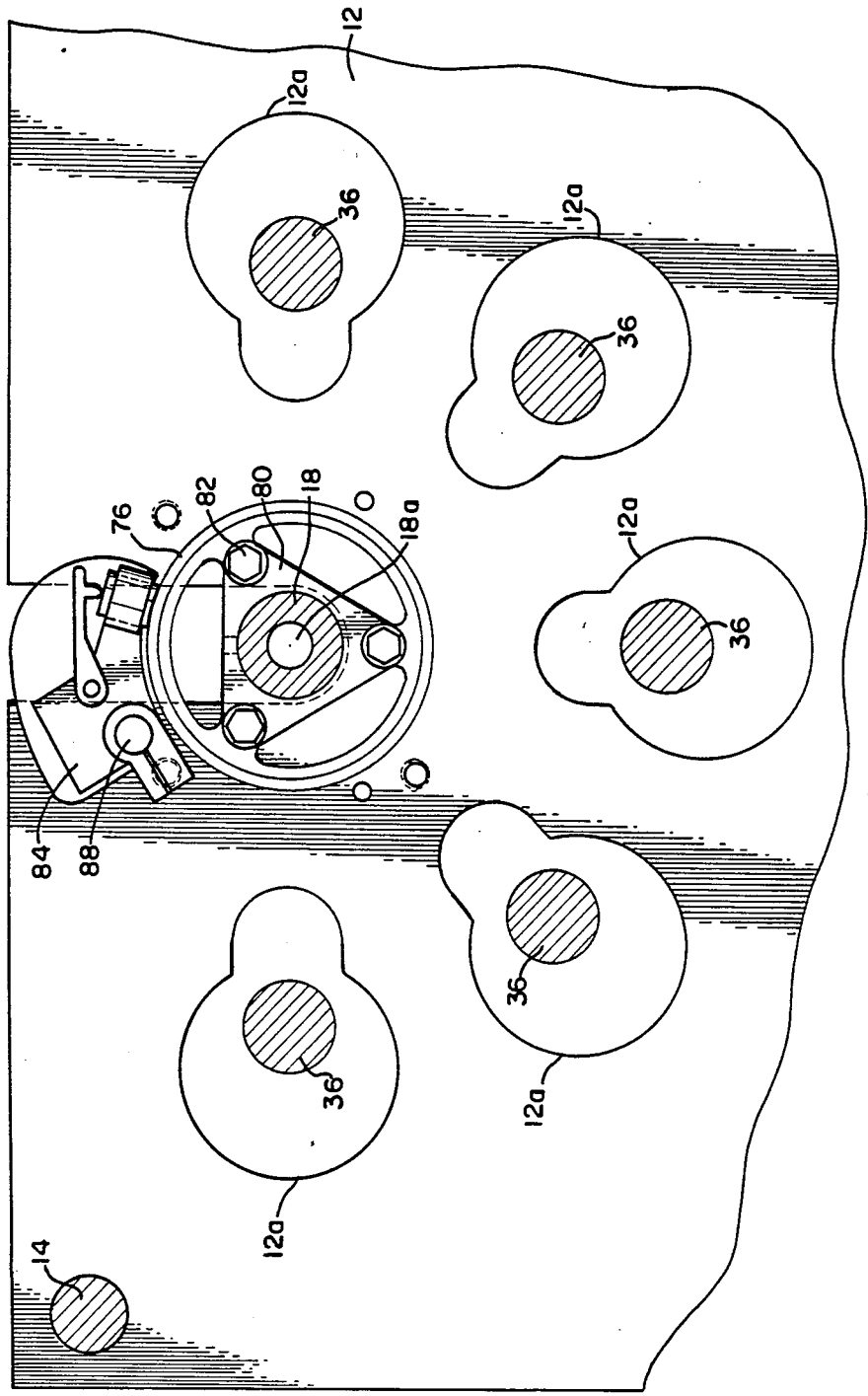
FIG. 3 is a vertical sectional view taken along the lines 3—3 in FIG. 2.

The electrical connections to the heater rod 50 for the continuously heated seal bar 22 are best seen in FIGS. 2 and 3. As shown in FIG. 2 the heater rod 50 is provided with right angle lead 70 which extends through the interior of the drum 16 from the left-hand end to the right-hand end and then extend at right angles into the bore 18a at the right-hand end of the shaft 18. The leads 70 are connected to a slip ring assembly 74 which is positioned at the end of the bore 18a on shaft 18. Also mounted at that end of the shaft 18 is a pair of collector rings 76, 78. The collectors 76, 78 are fixed for rotation with the shaft 18 by means of a clamp 80 and bolts, FIG. 3. Associated with the collector rings 76 and 78 are electrical brush assemblies 84 and 86 which are mounted in fixed position on a rod 88 which is supported from the side plate 12. Also positioned within the cavity 22a of the heater block 22 is a thermocouple assembly 90 the leads of which are adapted to extend through the interior of the cylindrical drum 16 along with the leads 70 of the heater rod 50 to the opposite end of the shaft 18. The thermocouple assembly 90 is adapted to sense the temperature of the heater block 22 and control the temperature thereof at a predetermined selected value.

In the operation of the rotary sealing apparatus 10, the web W is threaded around the cylindrical surface 16a of the drum 16 and between the rubber nip rolls 34. The air cylinders 44 are adjusted to apply pressure to the web W and force it against the cylindrical surface 16a of the seal drum 16. The circumference of the drum 16 has been selected to correspond to the width of the drawtape bags to be manufactured. Thus the drum 16 makes one revolution for each bag width and the heated seal bar 22, FIGS. 4–6, engages the web where the side seals of the bag are to be made. Since the cylindrical surface 16a and the web W are both moving at the same speed there is no relative motion between the two during the movement of the web through the rotary sealing apparatus 10. When the first of the rubber rolls 34 is forced against the web W by the air cylinder 44 and the roll 34 in turn forces the web W against the surface of the heated seal bar 22, this area of the web remains in contact with the surface of the heated seal bar 22 during rotation of drum 16 . This provides a dwell time for the sealing operation. The other nip rolls 34 successively force the same area of the film web against the heated seal bar 22 at the spaced locations of the nip rolls 34 thereby further enhancing the seal formed between the multiple layers of the web of film. As may be seen in FIGS. 5 and 6 the multiple layers of the web include the four layers of the bag material at the hems and the two layers of the drawtape material which are positioned inside the hems. In the preferred form of the invention the web material and the drawtapes are made of polyethylene film although other suitable thermoplastic material may be used.

Figure 6:
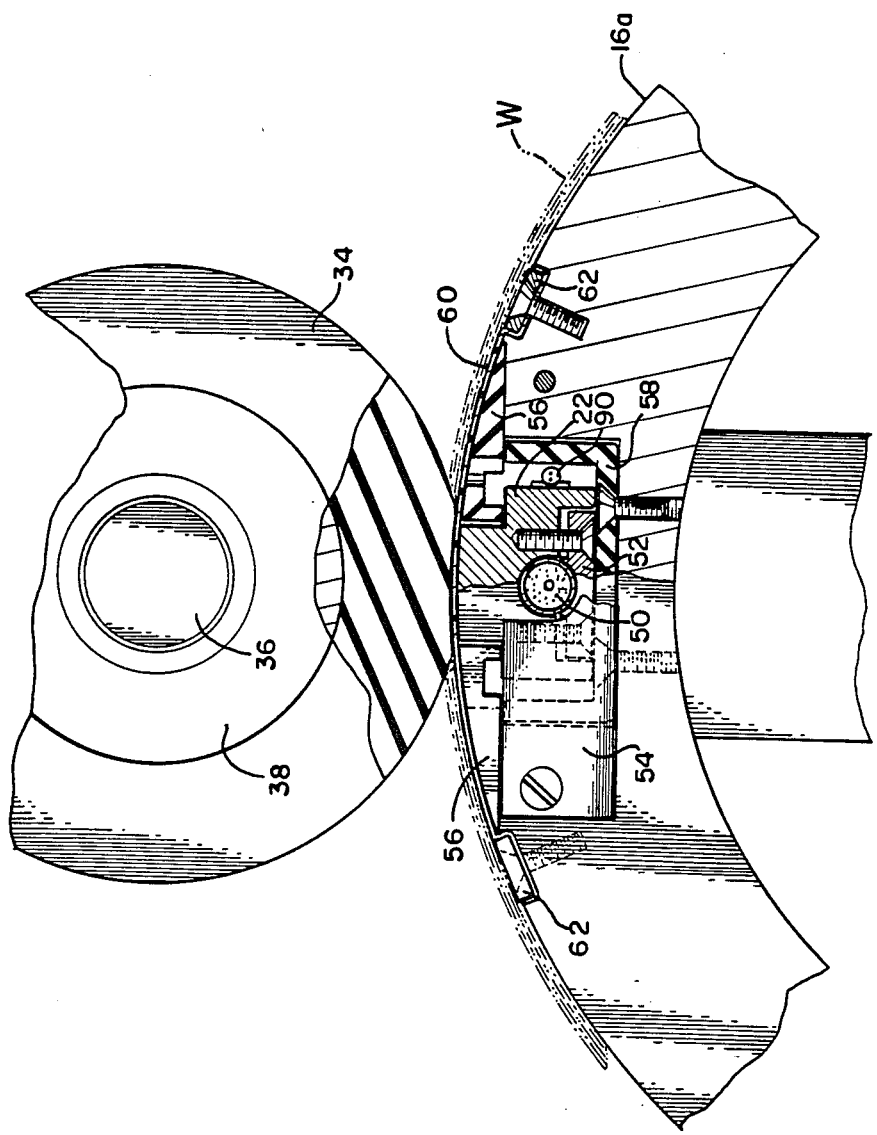
FIG. 6 is a fractional side elevation view taken along the lines 6—6 in FIG. 5 and showing one of the rubber rollers forcing the web W against the heater bar

As shown in FIG. 6, which is an enlarged fractional view showing one of the nip rolls 34 forcing the web W against the heated seal bar 22, the elastomer material from which the roll 34 is made is relatively soft and compressible so as to flatten itself against the web W under the pressure of the air cylinder 44. It has been found that silicone rubber having a durometer of 30-40 is suitable for the nip rolls 34 although it is to be understood that other equivalent materials having this characteristic may be used. By reason of the fact that the nip rolls 34 are deformable, they are adapted to hold the area of the web W to be sealed in contact with the heated seal bar for a greater distance than point contact between the heated seal bar and each of the nip rolls. This in effect provides a dwell time during the sealing contact between the web and the heated area 22 in the cylindrical surface 16a of the drum 16 at each of the spaced locations of the nips rolls 34. Thus the sealing time has been increased by the dwell time and also by providing a plurality of pressure applying stations.

From the foregoing it will be seen that the present invention provides a rotary sealing method and apparatus for high speed continuous motion heat sealing in the transverse direction of a moving, multiple layer web of thermoplastic film and does so in a manner which provides strong heat seals at the predetermined areas of the moving web without interrupting the continuous motion of the web.

Figure 4:
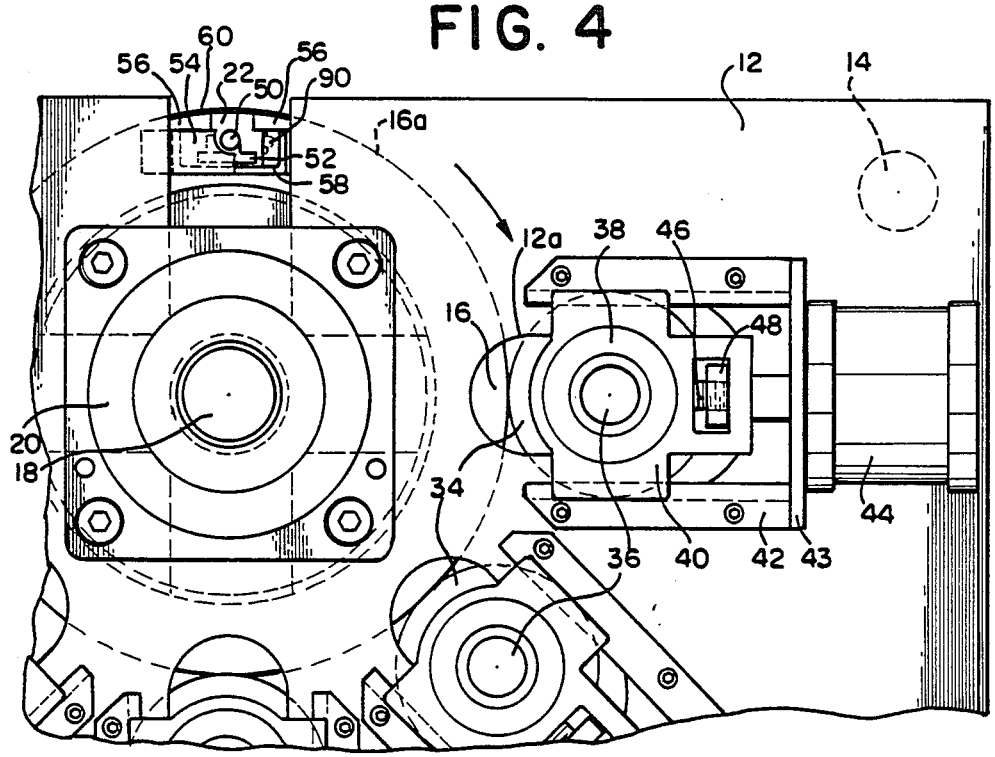
FIG. 4 is a fractional sectional view taken along the lines 4—4 in FIG. 2.

While a plurality of nip rolls 34 have been illustrated in the drawing for forcing the web W against the heated area 22 in the cylindrical surface 16 a of the drum 16, it is to be understood that at least in some applications a satisfactory seal can be accomplished with a single nip roll 34. The reason for this is the fact that once a roll 34 has pressed the web into sealing contact with the heated area 22 the web will remain in contact with the heated area 22 due to he tension on the web and since the web W travels at the same speed as the cylindrical surface 16a of the drum 16. Thus as shown in FIGS. 1 and 4, once the nip roll 34 shown at the upper right hand side of the drawing forces the web W into contact with the heated area 22 in the cylindrical surface 16a, the web will stay in contact with the heated area 22 until it leaves contact with the surface 16a. Thus it will be seen that a dwell time is provided between the time the web W engages the heated area 22 and the time that the web W leaves contact with the cylindrical surface 16a of the drum 16.

While a preferred embodiment of the invention has been illustrated, it is to be understood that further modifications may be made without departing from the spirit and scope of the invention as set forth in the appended claims.

We claim:

1. A method of heat sealing in the transverse direction a continuously moving multiple layer web of thermoplastic film to preseal the ends of draw tapes in hems in an edge of the web in the manufacture of draw tape bags comprising the steps of:
    providing a cylindrical drum mounted for rotation about the axis thereof,
    providing a continuously heated area in the cylindrical surface of the drum having a length extending axially of the drum corresponding to the width of the hems,
    wrapping the moving web of film with the draw tapes in the hems around the cylindrical surface of the drum,
    rotating the cylindrical surface of the drum at the same speed as the moving web of film so that there is no relative motion between the web and the cylindrical surface,
    pressing the hem area of the multiple layer web of thermoplastic film against the heated area in the cylindrical surface of the drum, and
    maintaining said hem area of the web against the heated area of the cylindrical surface of the drum during the substantial portion of the rotation thereof to preseal the ends of the draw tapes in the hems in the multiple layer web.

2. A method according to claim 1 wherein the hem area of the multiple layer web of thermoplastic film is pressed against the heated area in the cylindrical surface of the drum at a plurality of spaced locations about the cylindrical drum to form a heat seal in the multiple layer web.

3. A method according to claim 1 wherein the web is pressed against the heated area in the cylindrical surface by rubber covered rolls and the durometer of the rubber covered rolls is selected so as to provide a dwell during the sealing contact between the web and the heated area in the cylindrical surface of the drum at each of the spaced locations.

4. A rotary sealing apparatus for high speed continuous motion heat sealing in the transverse direction of a moving multiple layer web of thermoplastic film to preseal the ends of draw tapes in hems in an edge of the web in the manufacture of draw tape bags comprising:
    a drum having a cylindrical surface, said drum being mounted for rotation about the axis thereof, means for continuously rotating said drum so that the speed of said cylindrical surface is the same as the speed of the web of film, a continuously heated seal bar on said drum flush with said cylindrical surface, said heated seal bar extending axially of said drum a distance corresponding to the length of the seal to be formed in the hems in the edge of the web, and means for holding the web around said cylindrical surface of said drum comprising at least one elastomer nip roll disposed around a portion of said cylindrical surface of said drum and having the axis of said roll parallel to the axis of said drum, the hems in the edge of the web of film being adapted to pass over said heated seal bar on said cylindrical surface of said drum and under said elastomeric nip roll, and pressure means associated with said nip roll for forcing the hem area of the film web against said heated seal bar thereby causing a seal to form between the multiple layers in the hems of the web of film to preseal the ends of the draw tapes.

5. A rotary sealing apparatus according to claim 4 wherein said elastomer nip roll is deformable and is adapted to hold the area of the web to be sealed in contact with said heated seal bar for distance greater than point contact between said heated seal bar and each of said elastomer nip roll.

6. A rotary sealing apparatus according to claim 5 wherein said elastomer nip roll is rubber having 30–40 durometer.

7. A rotary sealing apparatus according to claim 6 wherein said nip roll is silicone rubber.

8. A rotary sealing apparatus according to claim 4 wherein said heated seal bar has a non-stick coating to prevent said heated seal bar from adhering to the web of film.

9. A rotary sealing apparatus according to claim 8 wherein said non-stick coating comprises a fluorocarbon.

10. A rotary sealing apparatus according to claim 9 wherein said fluorocarbon coating comprises a tape of polytetrafluoroethylene.

11. A rotary sealing apparatus according to claim 4 including means for heating said heated seal bar.

12. A rotary sealing apparatus according to claim 4 including means for sensing the temperature of said heated seal bar.

13. A rotary sealing apparatus according to claim 4 wherein said heated seal bar is mounted in a cavity in said drum adjacent one end thereof, said cavity for said heated seal bar extending axially of said drum a distance corresponding to the length of the seal to be formed in the hems in the web, heater means disposed within said heated seal bar, heat insulating means disposed within said cavity of said drum for insulating said heater means and said heated seal bar from said drum, and means extending over the heated seal bar and flush with the cylindrical surface of said drum for preventing said heated seal bar from sticking to the web of thermoplastic film.

14. A rotary sealing apparatus according to claim 2 wherein said means for holding the web around said cylindrical surface of said drum comprises a plurality of elastomer nip rolls disposed at spaced locations around a portion of said cylindrical surface of said drum and having the axes of said rolls parallel to the axis of said drum, and pressure means associated with each of said nip rolls for successively forcing the same area of the film web against said heated seal bar at the spaced locations of said nip rolls thereby causing a seal to form between the multiple layers of the web of film.

* * * * *